(12) United States Patent
Smith

(10) Patent No.: US 11,216,713 B2
(45) Date of Patent: Jan. 4, 2022

(54) POST PRINTING RF TAG ASSIGNMENT

(71) Applicant: Lundy Smith, Gardena, CA (US)

(72) Inventor: Lundy Smith, Gardena, CA (US)

( * ) Notice: Subject to any disclaimer, the term of this patent is extended or adjusted under 35 U.S.C. 154(b) by 0 days.

(21) Appl. No.: 16/820,357

(22) Filed: Mar. 16, 2020

(65) Prior Publication Data
US 2021/0287064 A1 Sep. 16, 2021

(51) Int. Cl.
G06K 19/077 (2006.01)
G06K 19/07 (2006.01)
G06K 19/06 (2006.01)

(52) U.S. Cl.
CPC .. *G06K 19/07758* (2013.01); *G06K 19/06028* (2013.01); *G06K 19/0723* (2013.01)

(58) Field of Classification Search
CPC ....... G06K 19/07758; G06K 19/06028; G06K 19/07703
USPC ........................................................ 235/492
See application file for complete search history.

(56) References Cited

U.S. PATENT DOCUMENTS

| 7,994,917 | B2 | 8/2011 | Hirota et al. | |
| 8,831,511 | B2 | 9/2014 | Reyner | |
| 8,988,200 | B2 | 3/2015 | Lee et al. | |
| 9,305,283 | B1* | 4/2016 | Lauka | G06K 19/07703 |
| 2006/0124722 | A1* | 6/2006 | Williams | G06Q 10/10 |
| | | | | 235/375 |
| 2006/0175401 | A1* | 8/2006 | Roberts | G07F 7/12 |
| | | | | 235/383 |
| 2006/0221363 | A1 | 10/2006 | Roth et al. | |
| 2007/0156281 | A1* | 7/2007 | Leung | G06Q 10/087 |
| | | | | 700/225 |
| 2008/0294487 | A1* | 11/2008 | Nasser | G06Q 30/0203 |
| | | | | 705/7.32 |
| 2010/0200657 | A1 | 8/2010 | Morgan | |
| 2011/0153614 | A1* | 6/2011 | Solomon | G06Q 10/087 |
| | | | | 707/740 |
| 2012/0109367 | A1* | 5/2012 | Fabian | G06Q 30/06 |
| | | | | 700/232 |
| 2013/0035950 | A1* | 2/2013 | MacDonald | G06Q 10/0875 |
| | | | | 705/2 |
| 2013/0057393 | A1* | 3/2013 | Yamamoto | G06K 17/0025 |
| | | | | 340/10.51 |
| 2013/0095864 | A1* | 4/2013 | Marovets | H04L 51/08 |
| | | | | 455/466 |
| 2013/0154802 | A1 | 6/2013 | O'Haire et al. | |
| 2013/0161382 | A1* | 6/2013 | Bauer | G06K 17/0025 |
| | | | | 235/375 |

(Continued)

FOREIGN PATENT DOCUMENTS

EP 1587019 10/2005
EP 2746992 6/2014

(Continued)

OTHER PUBLICATIONS

International Search Report and Written Opinion for International Patent Application No. PCT/US2021/022393, dated Jun. 29, 2021, 9 pages.

*Primary Examiner* — Allyson N Trail

(57) ABSTRACT

A method for correlating a product identifier of a product and an RF tag identification code after the step of printing visual representation of a product identifier onto a product label, and reading the visual representation of the product identifier.

12 Claims, 6 Drawing Sheets

(56) References Cited

U.S. PATENT DOCUMENTS

| | | | |
|---|---|---|---|
| 2013/0197945 A1* | 8/2013 | Anderson | G06Q 10/10 |
| | | | 705/4 |
| 2013/0316461 A1* | 11/2013 | Fujita | G01N 33/5005 |
| | | | 436/63 |
| 2014/0266620 A1 | 9/2014 | Iqbal | |
| 2015/0015366 A1* | 1/2015 | Hoffman | G06F 11/3409 |
| | | | 340/5.61 |
| 2018/0181908 A1* | 6/2018 | Jones | G06K 7/10366 |
| 2018/0263464 A1* | 9/2018 | Lohier | A61B 1/00016 |
| 2019/0087702 A1* | 3/2019 | Cotoc | G06K 1/20 |

FOREIGN PATENT DOCUMENTS

| | | |
|---|---|---|
| KR | 1020190104225 | 9/2019 |
| WO | 2018175558 | 9/2018 |

* cited by examiner

POST PRINTING RF TAG ASSIGNMENT

FIELD OF THE INVENTION

The field of the invention is RF tag applications and services.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Inventory tracking is a complex process, often involving the tracking, storage, and display of numerous products both in a physical location (e.g. a grocery store shelf) and in the associated data entry in an electronic database. The utilization of printed product identifiers, such as barcodes, is a known method of assigning data relevant to the product to the product itself. RF tags have several benefits which make them an effective replacement of barcodes. For example, while barcodes are optically read and their data is fixed at the time of printing, RF tags contain internal memory that can be read electronically by an RF tag scanner, and optionally reprogrammed to contain revised information. Additionally, relative to printed tags, RF tags allow for more information to be stored and transmitted to users, which improves upon the limited utility of normal barcodes.

In conventional RFID printing, many RFID tags are encoded as a unit with the same information. For example, RFID tags numbered from 1-1000 are associated with the same product. When a malfunction occurs, such as a jammed RFID encoder and printer, the affected portion of the RFID tags can be removed and their numbers dissociated from the product in the system.

However, this solution is not viable when each RFID tag and associated print is unique. For example, if once sheet of RFID tags from 75-100 is printed with four different types of products, then a printer jam can cause the entire sequence of downstream RFID tags to be incorrectly printed and assigned. In these situations, it is critical to allow the encoding and printing of RFID tags to be freely dissociated and reassigned to new RFID tags. In the previously mentioned example, the presently claimed invention allows the RFID tags to be reprinted and reassigned to tag number 75-100 and everything downstream can be subsequently shifted. In another example, the presently claimed invention can also allow the printing to continue as planned after clearing the jam and then dynamically print and assign the missing RFID tags to a sheet of 25 additional RFID tags at the end of the process.

EP2746992 to Barink teaches a method for bulk encoding of tags (e.g. RFID tags), and printing of codes onto the tags. In Barink, one or more tags are fed into a serialization module, a code is printed onto the tags, and serialization module writes the preconfigured data to multiple tags simultaneously so as to carry out a bulk encoding of the one or more tags, and prints a code onto the tag. However, Barink fails to contemplate the association of an RFID tag or tag code with an advertisement, QR code, or other visual representation of a product.

U.S. Pat. No. 8,988,200 to Lee teaches a method for translating, transcribing, and/or converting a printed label on a surface of an RFID tag into electronic data, which are writable to a non-volatile storage inside the RFID tag. However, Lee similarly fails to contemplate the association of an RFID tag or tag code with an advertisement, QR code, or other visual representation of a product.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods that correlate a product codes associated with product data (which can comprise any information associated with the product/service) to an RFID tag identification code and visual representations of a product.

SUMMARY OF THE INVENTION

The inventive subject matter provides apparatus, systems, and methods for correlating the printed representation of an RF tag identification code with a product code and associated product data.

In the prior art, product data can be stored and accessed in the form of a quick-response code (QR code), a textual code, and/or a data storage device (e.g., RFID tag). The present invention goes further contemplating the printing of a visual representation of the product and allowing the use of any type of identification medium in place of QR codes, including image and non-image based identification mediums.

In interpreting descriptions in this Specification, groupings of alternative elements or embodiments of the inventive subject matter are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
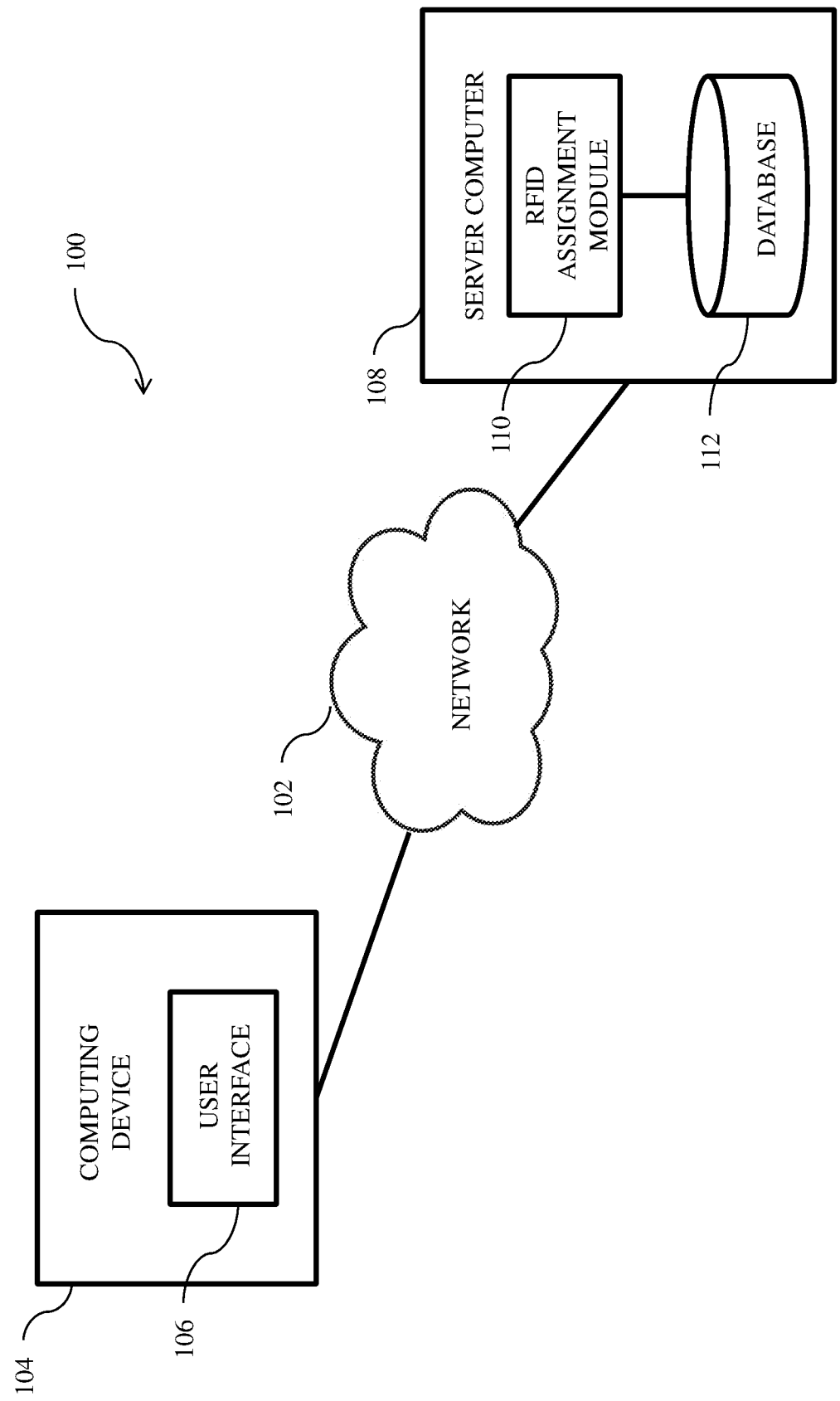
FIG. 1 is a functional block diagram illustrating a distributed data processing environment.

The following description includes information that may be useful in understanding the present invention. It is not an admission that any of the information provided herein is prior art or relevant to the presently claimed invention, or that any publication specifically or implicitly referenced is prior art.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to RFID assignment module 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure RFID assignment module 110 (discussed in more detail below) to enable a user to interface with RFID assignment module 110. It is contemplated that user interface 106 can allow a user to provide any information to RFID assignment module 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by RFID assignment module 110. In the depicted embodiment, RFID assignment module 110 resides on server computer 108. However, database 112 can reside anywhere within a distributed data processing environment provided that RFID assignment module 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
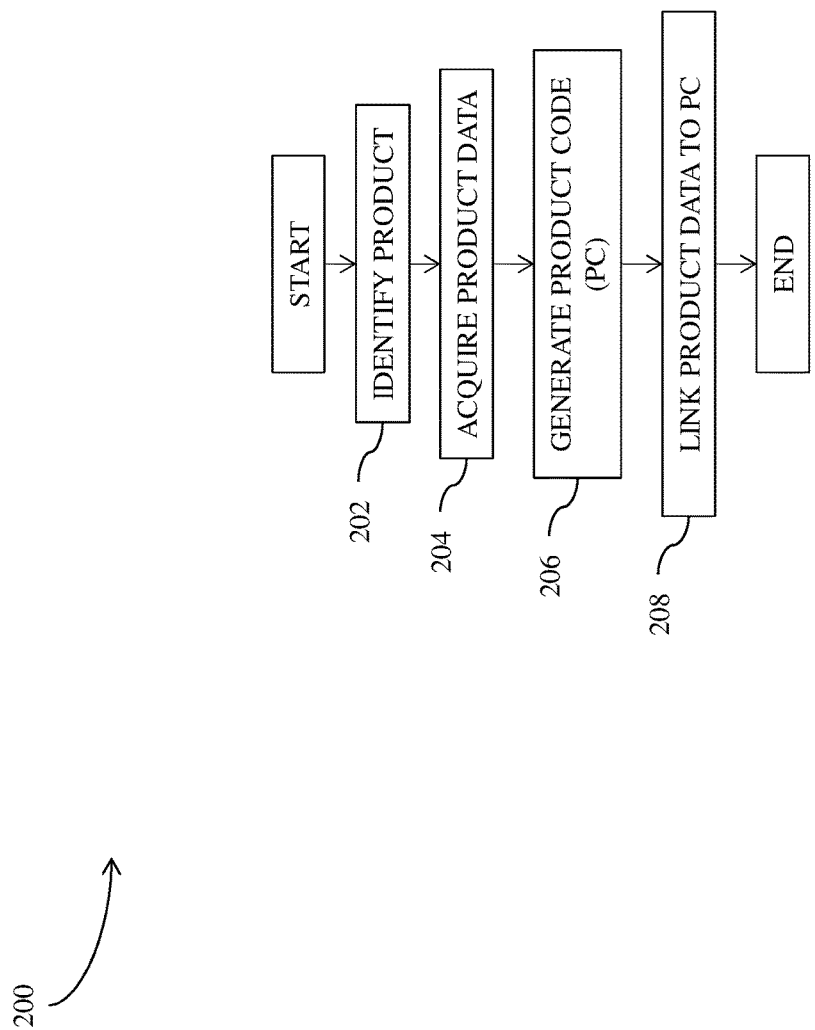
FIG. 2 is a flowchart depicting the acquisition of product data and generation of a product code associated with the product data.

FIG. 2 is a flowchart depicting the acquisition of product data and generation of a product code associated with the product data.

RFID assignment module 110 identifies at least one of a product and a service (step 202).

RFID assignment module 110 can identify the product and/or service in any manner known in the art.

In some embodiments, RFID assignment module 110 can identify the product and/or service directly.

For example, RFID assignment module 110 can be coupled to an image recognition device that automatically scans and identifies products and/or services. In another example, RFID assignment module 110 can receive wireless communications that identify a product or service, such as Bluetooth™ or any other wireless medium known in the art.

In other embodiments, RFID assignment module 110 can identify the product and/or service with the assistance of a separate entity.

For example, RFID assignment module 110 can identify a perishable product with the assistance of a human operator, such as a grocery store employee. In another example, RFID assignment module 110 can identify a service with the assistance of a human operator, such as a service technician.

In one embodiment, RFID assignment module 110 identifies a perishable good. For example, RFID assignment module 110 can receive an identification of an apple from an imaging module coupled with image recognition software. In another embodiment, RFID assignment module 110 can receive an identification of a mechanical component of a transmission from an imaging module couple with image recognition software.

RFID assignment module 110 acquires product data (step 204).

Product data can comprise any identifying information or attributes associated with a product and/or service. Additionally, product data can be acquired from any source known in the art. For example, product data can be numeric, qualitative, or alphanumeric. A numeric product identifier could be a Universal Product Code (UPC) or a European Article Number (EAN). A qualitative product identifier could be a product name or a product attribute. An alphanumeric product identifier could be a Manufacturer Part Number (MPN) or an International Standard Book Number (ISBN-10).

In one embodiment, RFID assignment module 110 acquires product data from a database, such as database 112.

For example, RFID assignment module 110 can identify a can of corn and acquire data regarding the canned corn's manufacturer, the volume of the contents, the expiration date, time since stocked, and any other information associated with the canned corn. In another example, product data can include a product location in a visual representation of an inventory display and/or a non-visual representation of an inventory display. It is contemplated that a visual representation of an inventory display can be a planogram. A non-visual representation of an inventory display can be a list comprising a product's location relative to other products.

In another embodiment, RFID assignment module 110 acquires product data via third party inputs. For example, RFID assignment module 110 can identify an auto part and receive inputs regarding the manufacturer, the price, and the warranty associated with the auto part from a service technician. In another example, RFID assignment module 110 can acquire product data for a grocery store item and receive inputs regarding a price, an item type, an expiration date, and an inventory schedule for the item from a store employee.

RFID assignment module 110 generates a product code (step 206).

Product codes can comprise any one or more representations of a product. For example, product codes can include graphical elements, textual elements, data elements, or any combination thereof.

In one embodiment, RFID assignment module 110 generates a graphical representation of a product code. For example, RFID assignment module 110 can generate a QR code with information identifying a particular product and its characteristics.

In another embodiment, RFID assignment module 110 generates a textual representation of a product code. For example, RFID assignment module 110 can generate an alphanumeric code that represents a particular good.

In yet another embodiment, RFID assignment module 110 generates a data representation of a product code. For example, RFID assignment module 110 can generate a data file containing the product code and the product's features.

In a combined embodiment, RFID assignment module 110 generates any one or more combinations of graphical elements, textual elements, and data elements. For example, RFID assignment module can generate a QR code and a data file that each include identifying information about a product.

In some embodiments, RFID assignment module 110 can generate representations of a product code that contain different information depending on the form factor. For example, RFID assignment module 110 can generate a QR code representing an ID number for a product and also generate a data file containing more detailed information about a product. In a more illustrative example, RFID assignment module 110 can generate a QR code that identifies a product as a granny smith apple, while also generating a data file that details the price, the distributor, the sale conditions, the sizing, and the sell-by date for the granny smith apple.

In an alternative example, the product code can be a barcode. However, it is contemplated that any reference to QR codes in the present application can be replaced with any type of product identifier. For example, QR codes can be alternatively replaced by any proprietary or commercially available identification system along with their respective ancillary technologies, such as near field communications or optics-based technologies.

RFID assignment module 110 links product data to the product code (step 208).

As discussed in step 206, RFID assignment module 110 can link any product data to a product code. Further, the product code can be in any one or more form factors.

In some embodiments, RFID assignment module 110 directly links product data to the product code, For example, RFID assignment module 110 can store product data directly onto an RFID tag linked to a product code.

In another embodiment, RFID assignment module 110 remotely links the product data to the product code by pointing to a remote data store containing the product data. For example, RFID assignment module 110 can assign a QR code representing a product with a pointer that causes a computing device, such as computing device 106, to access a remote database to retrieve the product data over network 102.

Figure 3:
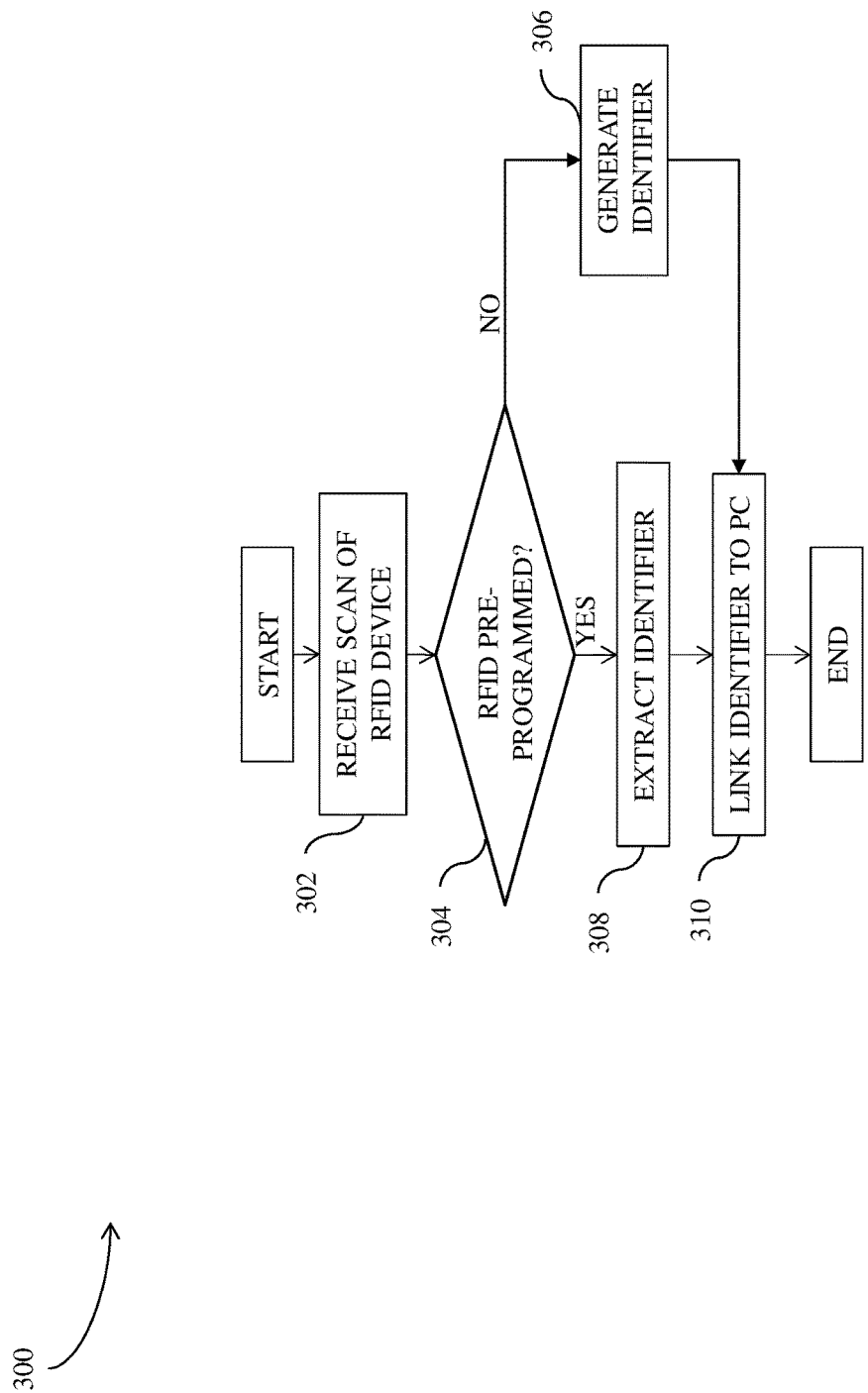
FIG. 3 is a flowchart depicting the linking of an RFID device and identifier therein to a product code.

FIG. 3 is a flowchart depicting the linking of an RFID device and identifier to a product code.

RFID assignment module 110 receives a scan of an RFID device (step 302).

It is contemplated that RFID assignment module 110 can receive a scan of an RFID device directly, indirectly, or any combination thereof. In one embodiment, RFID assignment module 110 is present on the a scanning device. In another embodiment, RFID assignment module 110 can receive a scan from a peripheral scanning device. For example, RFID assignment module 110 can receive a scan from a grocery store scanner that is coupled to RFID assignment module 110. It is contemplated that RFID assignment module 110 can be coupled to the any one or more scanning devices through at least one of a hardwired and wireless medium.

RFID devices can be active or passive. Active RFID devices are contemplated to be actively powered by a power source. Passive RFID devices are contemplated to use little to no external power sources. For example, passive RFID devices can include RFID tags.

RFID assignment module 110 determines whether the RFID device is preprogrammed (decision block 304).

In response to determining that the RFID device is not preprogrammed ("NO" branch, decision block 304), RFID assignment module 110 generates an identifier (step 306).

It is contemplated that identifiers can be any data stored on an RFID device associated with an RFID tag. Identifiers can comprise any data that is uniquely associated with the RFID device. For example, the identifier can be a pre-existing identifier that was originally tied to a different product or service.

In response to determining that the RFID device is preprogrammed ("YES" brand, decision block 304), RFID assignment module 110 extracts a pre-existing identifier (step 308).

RFID assignment module 110 links at least one of a pre-existing identifier and a generated identifier to a product code (step 310).

In embodiments where RFID assignment module 110 links a pre-existing identifier to a product code, it is contemplated that RFID assignment module 110 skips steps required to create unique identifiers for an RFID tag to link to a product code. For example, RFID assignment module 110 can reassign a pre-existing identifier on an RFID tag that was originally linked to an automobile windshield parts number to a catalytic converter.

In this way, the present invention removes the need for each RFID tag to be reprogrammed each time to contain new data associated with a new product. Instead, RFID assignment module 110 can freely assign pre-existing RFID devices to new products and/or services. As such, RFID assignment module 110 is contemplated to reduce the amount of steps required to reassign RFID devices, which increases the overall efficiency of RFID device reliant systems, such as inventory management.

Figure 4:
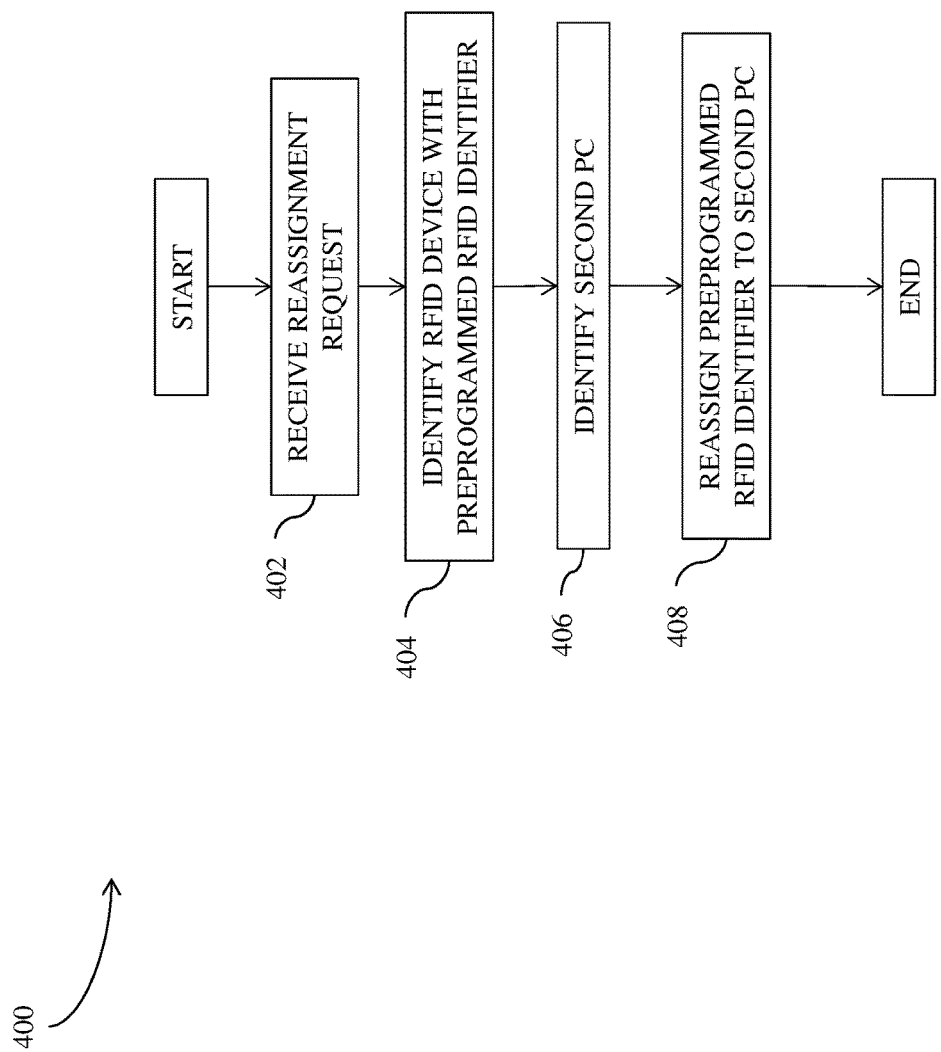
FIG. 4 is a flowchart depicting the reassignment of the existing programming on an RFID device to a different product code.

FIG. 4 is a flowchart depicting the reassignment of the existing programming on an RFID device to a different product code.

RFID assignment module 110 receives a reassignment request (step 402).

RFID assignment module 110 can receive a reassignment request directly or indirectly.

In one embodiment, RFID assignment module 110 can be coupled to an input device with a user interface, such as computing device 104 and user interface 106, and receive a direct reassignment request. For example, a grocery store clerk can scan a QR code containing product data and a product code for a soft drink and request a reassignment of a spare RFID tag with a pre-existing identifier to the QR code.

In other embodiments, RFID assignment module 110 can indirectly receive a reassignment request from a third party. For example, RFID assignment module 110 can receive communications from a separate computer program preemptively requesting that an RFID identifier associated with a mechanical part for a discontinued automobile be reassigned to a new mechanical part for a soon-to-be released automobile. In this example, there may be no existing product and product code to scan.

RFID assignment module 110 identifies the RFID device with a preexisting RFID identifier (step 404).

As discussed above, RFID assignment module 110 can extract a preexisting RFID identifier in any manner known in the art.

RFID assignment module 110 receives a second product code (step 406).

As discussed in step 402, RFID assignment module 110 can receive a second product code to assign a preexisting RFID identifier directly or indirectly. In a direct example, RFID assignment module 110 can receive a second product code associated with a bag of chips that has been scanned on the store floor by an employee.

In an indirect example, RFID assignment module 110 can receive remote instructions to reassign an RFID identifier associated with a discontinued product to a unreleased product that will be placed on a shelf with an RFID tag associated with the discontinued product. As illustrated by the above example, the present invention contemplates more efficient inventory management that removes steps and allows users to reassign RFID devices to new products/services, which increases the flexibility of the system to accommodate a variety of inventory circumstances (e.g., inventory seasonality, unanticipated inventory developments, etc.).

RFID assignment module 110 reassigns the preexisting RFID identifier to a second product code (step 408).

Figure 5:
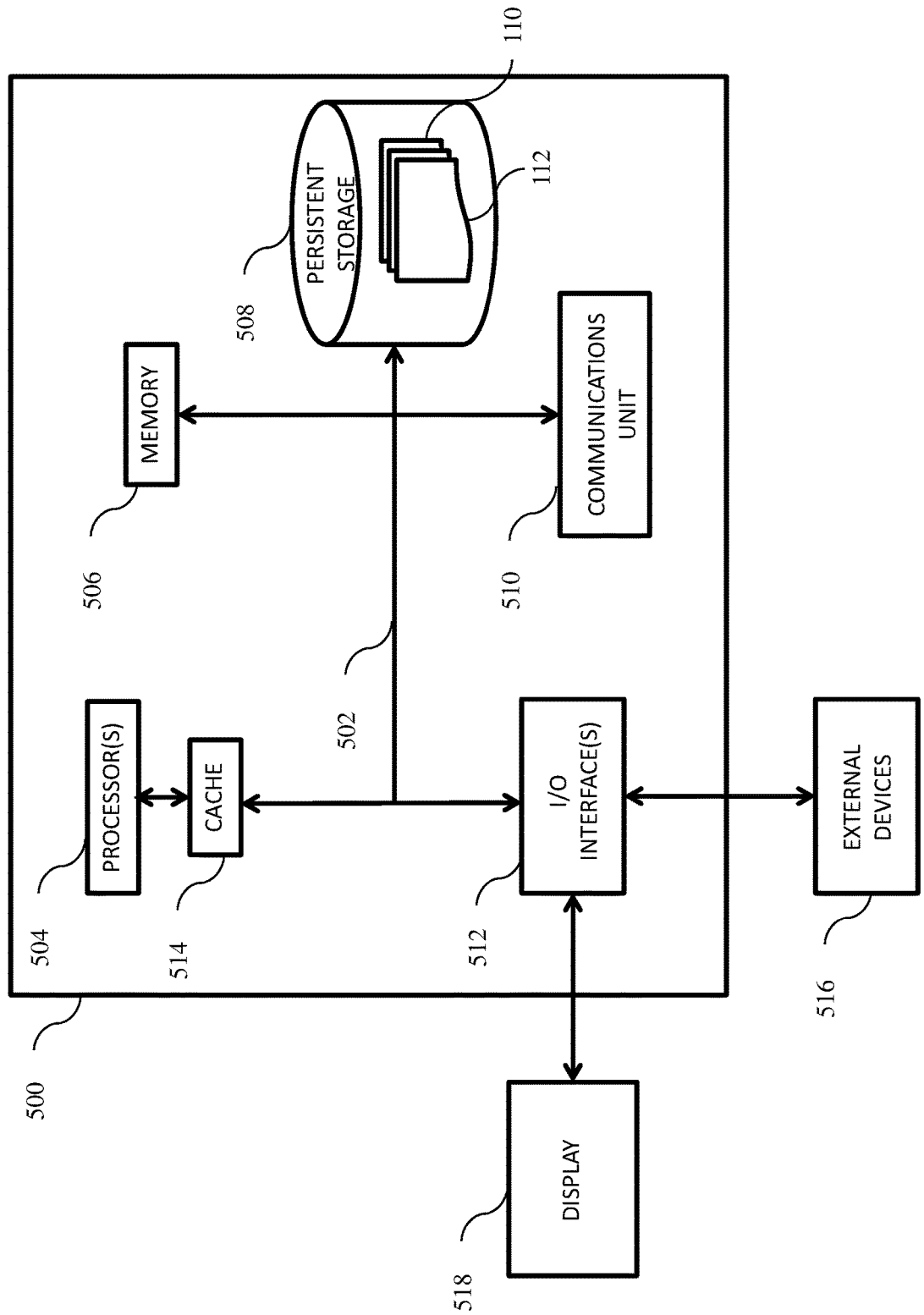
FIG. 5 depicts a block diagram of components of the server computer executing the programming generation module within the distributed data processing environment of FIG. 1.

FIG. 5 depicts a block diagram of components of the server computer executing the programming generation module within the distributed data processing environment of FIG. 1.

In one embodiment, the computer includes processor(s) 504, cache 514, memory 506, persistent storage 508, communications unit 510, input/output (I/O) interface(s) 512, and communications fabric 502.

Communications fabric 502 provides a communication medium between cache 514, memory 506, persistent storage 508, communications unit 510, and I/O interface 512.

Communications fabric 502 can include any means of moving data and/or control information between computer processors, system memory, peripheral devices, and any other hardware components.

Memory 506 and persistent storage 508 are computer readable storage media. As depicted, memory 506 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 506 and persistent storage 508 are random access memory and a hard drive hardwired to computing device 104, respectively. For example, computing device 104 can be a computer executing the program instructions of context engine 110 communicatively coupled to a solid state drive and DRAM.

In some embodiments, persistent storage 508 is removable. For example, persistent storage 508 can be a thumb drive or a card with embedded integrated circuits.

Communications unit 510 provides a medium for communicating with other data processing systems or devices, including data resources used by computing device 104. For example, communications unit 510 can comprise multiple network interface cards. In another example, communications unit 510 can comprise physical and/or wireless communication links.

It is contemplated that context engine 110, database 112, and any other programs can be downloaded to persistent storage 508 using communications unit 510.

In a preferred embodiment, communications unit 510 comprises a global positioning satellite (GPS) device, a cellular data network communications device, and short to intermediate distance communications device (e.g., Bluetooth®, near-field communications, etc.). It is contemplated that communications unit 510 allows computing device 104 to communicate with other computing devices 104 associated with other users.

Display 518 is contemplated to provide a mechanism to display information from context engine 110 through computing device 104. In preferred embodiments, display 518 can have additional functionalities. For example, display 518 can be a pressure-based touch screen or a capacitive touch screen.

In yet other embodiments, display 518 can be any combination of sensory output devices, such as, for example, a speaker that communicates information to a user and/or a vibration/haptic feedback mechanism. For example, display 518 can be a combination of a touchscreen in the dashboard of a car, a voice command-based communication system, and a vibrating bracelet worn by a user to communicate information through a series of vibrations.

It is contemplated that display 518 does not need to be physically hardwired components and can, instead, be a collection of different devices that cooperatively communicate information to a user.

Figure 6:
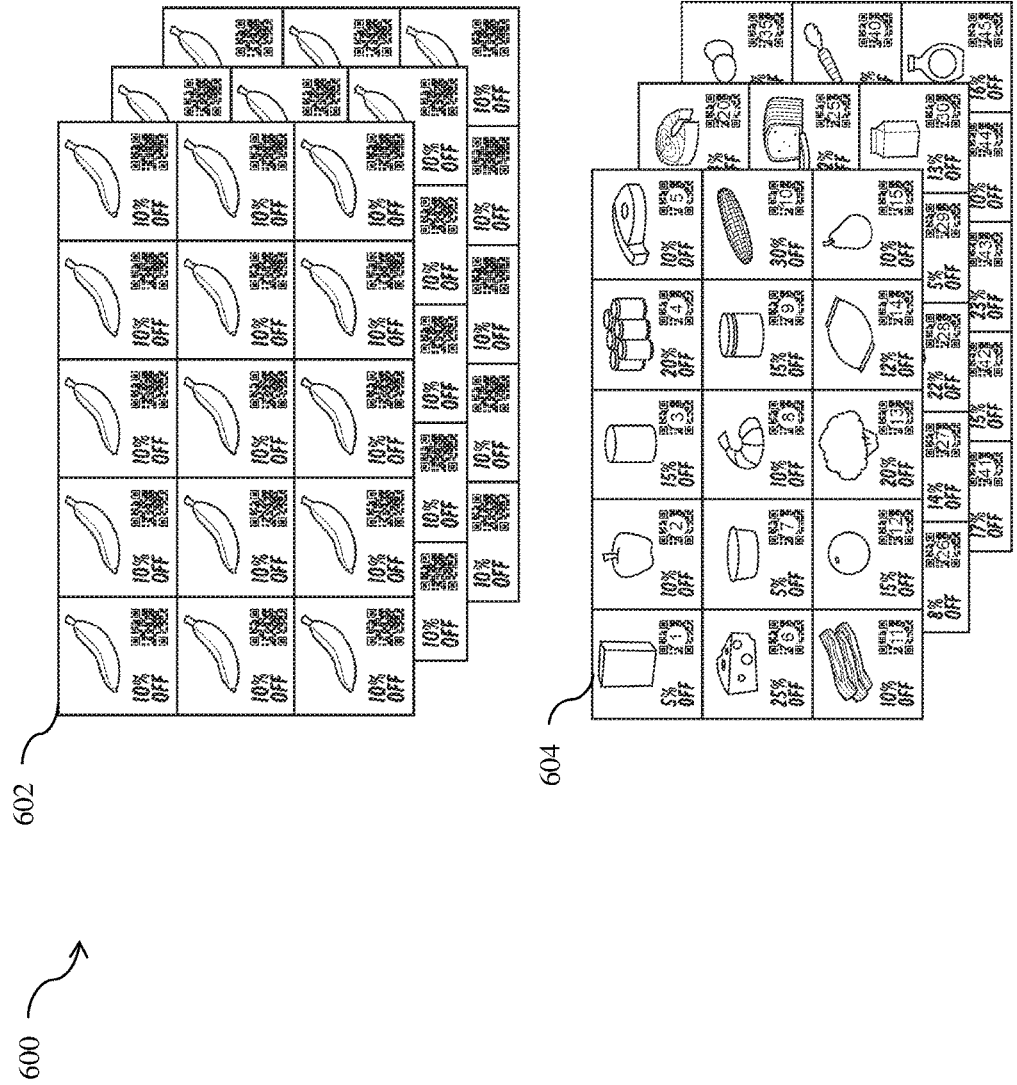
FIG. 6 depicts an illustrative embodiment depicting a variety of differently encoded and labeled RFID devices enabled by the steps depicted in FIG. 2, FIG. 3, and FIG. 4.

FIG. 6 depicts an illustrative embodiment 600 depicting a variety of differently encoded and labeled RFID devices enabled by the steps depicted in FIG. 2, FIG. 3, and FIG. 4.

RFID tags 602 can be programmed in bulk for particular products without allowing each RFID tag in a set of RFID tags to be individually encoded and labeled with different product codes.

Additionally, RFID assignment module 110 can individually encode each RFID tag in a set of RFID tags 604 with a mixture of different product codes. Allowing encoding of different products for each RFID tag in the set of RFID tags 604 removes the step of encoding each RFID tag or set of RFID tags 602 with one product code. As such, the present invention can, for example, enable a grocery store to (1) print out new sheet of RFID tags, wherein the RFID tags can have an visible tag number, (2) print a consumer viewable, such as a picture and/or an advertisement, on the RFID tag, (3) identify the product using the consumer viewable, and/or identify the RFID code using RFID signal or consumer viewable, and (4) use a database to correlate a product with the consumer viewable and the RFID code. As such, the present inventive concept, in its practical application, enables entities to centralize printing operation by allowing the dynamic reprinting and reallocation of product identifiers and their respective codes by using, for example, printers outfitted with one or more scanning technologies.

For example, RFID assignment module 110 can encode a first tag with the product code, a product identifier (e.g., QR code or any other visual and/or non-visual identification medium), and promotional discount for a bunch of bananas and encode an adjacent tag with a product code, QR code, and different promotional discount for kitchen shears.

The present invention can allow different products to be encoded into the set of RFID tags 604 and further be freely reassigned to account for issues in the printing and encoding of RFID tags. This contemplated increase in flexibility and efficiency allow malfunctions in the printing and encoding of RFID tags to be easily rectified. As such, the inventive concept herein greatly improved upon conventional RFID systems.

For example, RFID assignment module 110 can cause RFID tags numbered 50-75 that failed in the initial print to be reprinted and reassigned to tag number 75-100 causing each RFID tag downstream to be shifted to a different number. In another example, the presently claimed invention can also allow the printing to continue as planned after clearing the jam and then dynamically print and assign the missing RFID tags to a sheet of 25 additional RFID tags at the end of the process.

The set of RFID tags 600 can also be reassigned in the present invention without reencoding each RFID tag by allowing existing data on RFID tags to be reassigned to new products/services without reencoding the RFID tags. As such, the present invention can enable a user to employ many different options to either reassign products to RFID tags or reprint RFID tags at will.

As illustrated in FIG. 6, the present invention greatly increases the flexibility and efficiency of conventional RFID systems by circumventing the conventional processes of encoding and reencoding RFID tags.

For the purposes of this application, the term "re-encodable" can be used to describe devices that can be encoded, erased, and encoded again.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for applying an identifier to a product, comprising:
   printing, using one or more computer processors, a visual representation of a product identifier onto a product label physically coupled to an RF tag;
   reading, using the one or more computer processors, the visual representation of the product identifier from the product label;
   correlating, using the one or more computer processors, the product identifier and an identification code of the RF tag on a data store;
   determining, using the one or more computer processors, whether at least one of the product identifier and the identification code of the RF tag requires reassignment; and
   responsive to determining that at least one of the product identifier and the identification code of the RF tag requires reassignment, reassigning at least one of the product identifier and the identification code of the RF tag, wherein the reassignment is remotely executed.

2. The method of claim 1, wherein the identification code was assigned to the RF tag prior to the step of printing the visual representation of the product identifier.

3. The method of claim 1, further comprising programming RF tag with the identification code following the step of reading the visual representation of the product identifier.

4. The method of claim 1, wherein the visual representation of the product identifier comprises a barcode.

5. The method of claim 1, wherein the RF tag is passive.

6. The method of claim 1, wherein the RF tag is active.

7. The method of claim 1, further comprising using the data store to correlate the product identifier with a location at an inventory display.

8. The method of claim 7, wherein the step of correlating the product identifier with a location at an inventory display comprises a planogram.

9. A system for applying identifiers to products, comprising;
   a product identification label, comprising:
      an encodable near fields communication device; and
      a housing comprising the encodable near fields communication device and a first surface, wherein the first surface of the housing includes a visual representation of a product identifier and a visual representation of a product identification code; and
   a computing device programmed to:
      read the visual representation of the product identifier;
      correlate the product identifier and the product identification code;
      determine whether at least one of the product identifier and the identification code requires reassignment; and
      responsive to determining that at least one of the product identifier and the identification code requires reassignment, reassign at least one of the product identifier and the identification code, wherein the reassignment is remotely executed.

10. The system of claim 9, wherein a material of the housing is at least one of a synthetic material and a non-synthetic material.

11. The system of claim 9, wherein a material of the housing is a mixture of a synthetic and non-synthetic material.

12. The system of claim 9, wherein the encodable near fields communication device is re-encodable.

* * * * *